United States Patent
Subramanian et al.

(10) Patent No.: US 6,676,381 B2
(45) Date of Patent: Jan. 13, 2004

(54) METHOD AND APPARATUS FOR CASTING NEAR-NET SHAPE ARTICLES

(75) Inventors: Pazhayannur Ramanathan Subramanian, Niskayuna, NY (US); Melvin Robert Jackson, Niskayuna, NY (US); Paul Leonard Dupree, Scotia, NY (US); Bernard Patrick Bewlay, Schenectady, NY (US); Theodore McCall Evenden, Pattersonville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/063,249

(22) Filed: Apr. 3, 2002

(65) Prior Publication Data

US 2003/0190235 A1 Oct. 9, 2003

(51) Int. Cl.$^7$ ............................................. F01D 5/28
(52) U.S. Cl. ........................ 416/241 B; 164/518
(58) Field of Search .................. 164/519, 518, 164/517, 516, 361; 416/241 B, 241 R; 415/200

(56) References Cited

U.S. PATENT DOCUMENTS

| 5,443,111 A | * | 8/1995 | Colvin et al. ............... 164/254 |
| 6,237,671 B1 | * | 5/2001 | Lassow et al. ............. 164/76.1 |
| 6,255,000 B1 | * | 7/2001 | O'Connor et al. .......... 428/586 |

* cited by examiner

*Primary Examiner*—Edward K. Look
*Assistant Examiner*—Kimya N McCoy
(74) *Attorney, Agent, or Firm*—Robert P. Santandrea; Patrick K. Patnode (57) ABSTRACT

A method and apparatus for casting a near-net-shape article from a high temperature material, such as a refractory metal intermetallic composite material. The apparatus includes: a means for forming a molten material comprising at least one of a metal and an alloy; a means for pouring the molten material; a mold assembly comprising a solid shell having a face coat interposed between the solid shell and molten material; and a heater assembly for maintaining the solid shell at a temperature. The molten material solidifies within the solid shell to form a near-net shape of the article. The near-net shape article may be a turbine assembly component, such as, but not limited to, a vane or airfoil.

93 Claims, 5 Drawing Sheets

Fig. 5C

METHOD AND APPARATUS FOR CASTING NEAR-NET SHAPE ARTICLES

This invention was made with Government support under Contract No. F33615-98-C-5215, awarded by the United States Air Force, Department of Defense, and the United States Government therefore has certain rights in the invention.

BACKGROUND OF INVENTION

The present invention relates to casting a near-net-shape article. More particularly, the present invention relates to an apparatus for casting a near-net shape article, such as, for example, an airfoil for a gas turbine assembly, from high-temperature materials, such as niobium-base suicides and molybdenum-base silicides. The present invention also relates to methods for casting a near-net-shape article.

In a gas turbine assembly, such as an aeronautical turbine, a land-based turbine, a marine-based turbine, and the like, compressed air is mixed with fuel in a combustor and ignited, generating a flow of hot combustion gases through one or more turbine stages that extract energy from the gas, producing output power. Each turbine stage includes a stator nozzle having vanes that direct the combustion gases against a corresponding row of turbine blades extending radially outwardly from a supporting rotor disk. The vanes and blades include airfoils having a generally concave "pressure" side and a generally convex "suction" side, both sides extending axially between leading and trailing edges over which the combustion gases flow during operation. The vanes and blades are subject to substantial heat load, and, because the efficiency of a gas turbine assembly is a function of gas temperature, the continuous demand for efficiency translates to a demand for airfoils that are capable of withstanding higher temperatures for longer service times.

Many components of gas turbine assemblies, including turbine airfoils on such components as vanes and blades, are usually made of superalloys. The term "superalloy" is usually intended to embrace iron-, cobalt-, or nickel-based alloys, which include one or more other elements, including such non-limiting examples such as aluminum, tungsten, molybdenum, titanium, and iron. Superalloys exhibit desirable chemical and physical properties under the high temperature, high stress, and high-pressure conditions generally encountered during turbine operation. However, turbine components such as, for example, airfoils in modern jet engines—can only operate at temperatures as up to about 1,150° C., which is about 85% of the melting temperatures of most Ni-based superalloys. Furthermore, advanced design concepts call for turbine component operating temperatures beyond the capabilities of state-of-the-art superalloys to maintain properties such as strength and creep resistance in a required range. Therefore, there is a desire in the industry to exploit the advantages of certain new classes of materials for use in gas turbine assemblies.

Refractory metal intermetallic composite materials, including, but not limited to, those comprising silicon (Si) and at least one of niobium (Nb) and molybdenum (Mo), possess a useful range of mechanical properties in the temperature range required by turbine assembly designs. Examples of materials of this type include, for example, those described in U.S. Pat. Nos. 5,833,773 and 5,932,033. Although the properties of this class of materials are attractive for use in advanced high-temperature applications, such as gas turbine assemblies, processing such materials, especially to near-net shapes, remains a significant technical challenge. Therefore, what is needed is an apparatus and a method to produce articles, such as components of turbine assemblies, in near-net-shape form. What is also needed is an apparatus and a method to form refractory metal intermetallic composite materials into near-net shape articles.

SUMMARY OF INVENTION

The present invention meets this and other needs by providing a method and apparatus for casting a near-net-shape article from a high temperature material, such as a refractory metal intermetallic composite material. The near-net shape article may be a turbine assembly component, such as, but not limited to, a vane or an airfoil.

Accordingly, one aspect of the invention is to provide an apparatus for casting an article. The apparatus comprises: a means for forming a molten material, the molten material comprising at least one of a metal and an alloy; a means for pouring the molten material from the means for forming the molten material, wherein the means for pouring the molten material includes a cup for receiving the molten material in a superheated state; a mold assembly for receiving the molten material from the cup, the mold assembly comprising a solid shell for containing the molten material, the shell having a face coat, wherein the face coat is disposed on an inner surface that contacts the molten material such that the face coat is interposed between the solid shell and the molten material, the face coat comprising at least one of an oxide, a silicide, a silicate, an oxysulfide, and a sulfide and containing at least one of a rare earth metal, a refractory metal, and combinations thereof, and a heater assembly for maintaining the solid shell at a predetermined temperature, wherein the molten material solidifies within the cavity to form a near-net shape of the article.

A second aspect of the invention is to provide a mold assembly for casting an article from a molten material. The mold assembly comprises: a mold comprising a ceramic shell defining a cavity therein for receiving the molten material, and at least one face coat of a refractory material disposed on an inner surface of the ceramic shell in the cavity such that the face coat is interposed between the solid shell and the molten material, the refractory material comprising at least one of hafnia, erbia, zircon, yttria, ceria, zirconia, and at least one stabilized zirconia; and a heater assembly for heating the mold to a predetermined temperature and controlling a temperature of the mold, the heater assembly being proximate to an outer surface of the mold.

A third aspect of the invention is to provide an apparatus for casting an article. The apparatus comprises: a means for forming a molten material, the molten material comprising at least one of a metal and an alloy; a means for pouring the molten material from the means for forming the molten material, wherein the means for pouring the molten material includes a cup for receiving the molten material in a superheated state; a mold assembly for receiving the molten material from the cup, the mold assembly comprising a ceramic shell for containing the molten material, the ceramic shell defining a cavity therein for accepting the molten material, and at least one face coat of a refractory material disposed on an inner surface of the ceramic shell in the cavity such that the face coat is interposed between the solid shell and the molten material, the refractory material comprising at least one of hafnia, erbia, zircon, yttria, ceria, zirconia, and stabilized zirconia, wherein the face coat contacts the molten material; and a heater assembly for heating the mold to a predetermined temperature and controlling a temperature of the mold, the heater assembly being proximate to an outer surface of the mold, wherein the molten material solidifies within the cavity to form a near-net shape of the article.

A fourth aspect of the invention is to provide a method of casting a near-net shape article. The method comprises the steps of: forming a molten material comprising at least one of a metal and an alloy; pouring the molten material into a cup; maintaining the molten material in a superheated state within the cup; receiving the molten material from the cup in a mold assembly, wherein the mold assembly comprises a solid shell for containing the molten material, the solid shell having a face coat disposed on an inner surface of the solid shell that contacts the molten material, the face coat comprising at least one of an oxide, a silicide, a silicate, an oxysulfide, and a sulfide and containing at least one of a rare earth metal, a refractory metal, and combinations thereof; and solidifying the molten material in the mold assembly to form the near-net shape of the article.

A fifth aspect of the invention is to provide a method of casting a near-net shape article from at least one alloy comprising silicon and at least one of niobium, molybdenum, titanium, and chromium. The method comprises the steps of: providing the at least one alloy comprising silicon and at least one of niobium, molybdenum, titanium, and chromium; forming a molten material comprising the alloy; pouring the molten material into a cup; maintaining the molten material in a superheated state within the cup; receiving the molten material from the cup in a mold assembly, wherein the mold assembly comprises a ceramic shell having a cavity for receiving the molten material and at least one face coat of a refractory material disposed on an inner surface of the ceramic shell in the cavity, wherein the refractory material comprises at least one of hafnia, erbia, zircon, yttria, ceria, zirconia, and stabilized zirconia; and solidifying the molten material in the mold assembly to form the near-net shape article.

A sixth aspect of the invention is to provide a near-net shape article comprising at least one alloy comprising silicon and at least one of niobium, molybdenum, titanium, and chromium. The near-net shape article is cast by: forming a molten material comprising the at least one alloy; pouring the molten material into a cup; maintaining the molten material in a superheated state within the cup; receiving the molten material from the cup in a mold assembly, wherein the mold assembly comprises a ceramic shell and at least one face coat of a refractory material disposed on an inner surface of the ceramic shell in the cavity, wherein the refractory material comprises at least one of hafnia, erbia, zircon, yttria, ceria, zirconia, and stabilized zirconia; heating the mold assembly to a temperature at which the molten material is in a fluid state; and solidifying the molten material in the mold assembly to form a near-net shape article.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Investment casting is a well-established process for fabricating turbine assembly components, such as airfoils, using conventional superalloys. The process generally employs casting molds made by coating precisely shaped mold patterns made of an expendable material, such as wax, with a slurry comprising a mold material that is dimensionally stable at the melting temperature of the metal or alloy to be cast. Examples of the slurry material include plaster (for lower-melting point metals such as aluminum alloys) and ceramic materials (for casting higher melting point metals such as nickel alloys). When a coated mold pattern is baked to harden the slurry, the expendable material melts or evaporates, leaving behind a hollow casting mold that is ready to receive the molten metal. This technique offers a high degree of dimensional control over the resulting cast metal part; often parts formed by investment casting have dimensions within specification limits with little or no machining needed after casting, a condition referred to in the art as "near-net shape." Such exceptional control contributes to the popularity of investment casting for forming components with thin walls, tight tolerances, and complex shapes, such as, for example, airfoils for gas turbine assemblies.

Investment casting of advanced high-temperature materials such as, for example, refractory metal intermetallic composite materials, is a significant technical challenge for a number of reasons. A number of refractory metal intermetallic composite materials, including, for example, those comprising niobium (Nb) and silicon (Si) (also referred to hereinafter as "Nb—Si alloys") or molybdenum (Mo) and silicon (Si) (also referred to hereinafter as "Mo—Si alloys"), are highly reactive with conventionally used mold materials, such as alumina- and silica-based molds, causing an undesirable reaction to occur at the interface of the molten metal and the mold that often results in the dissolution of the mold into the molten metal. Furthermore, Nb—Si alloys and the like generally have a high melting point, which increases the risk of localized premature solidification of the molten metal in molds with complicated shapes, where maintaining the temperature of the molten metal within a desirable range is often difficult; such a condition often results in parts having undesirable porosity and inhomogeneous microstructures and compositions. Embodiments of the present invention overcome these and other problems by providing a layer of material that is resistant to chemical attack by the molten material, hereinafter referred to as a "face coat," to the surface of the mold that comes into contact with the molten metal.

Figure 1:
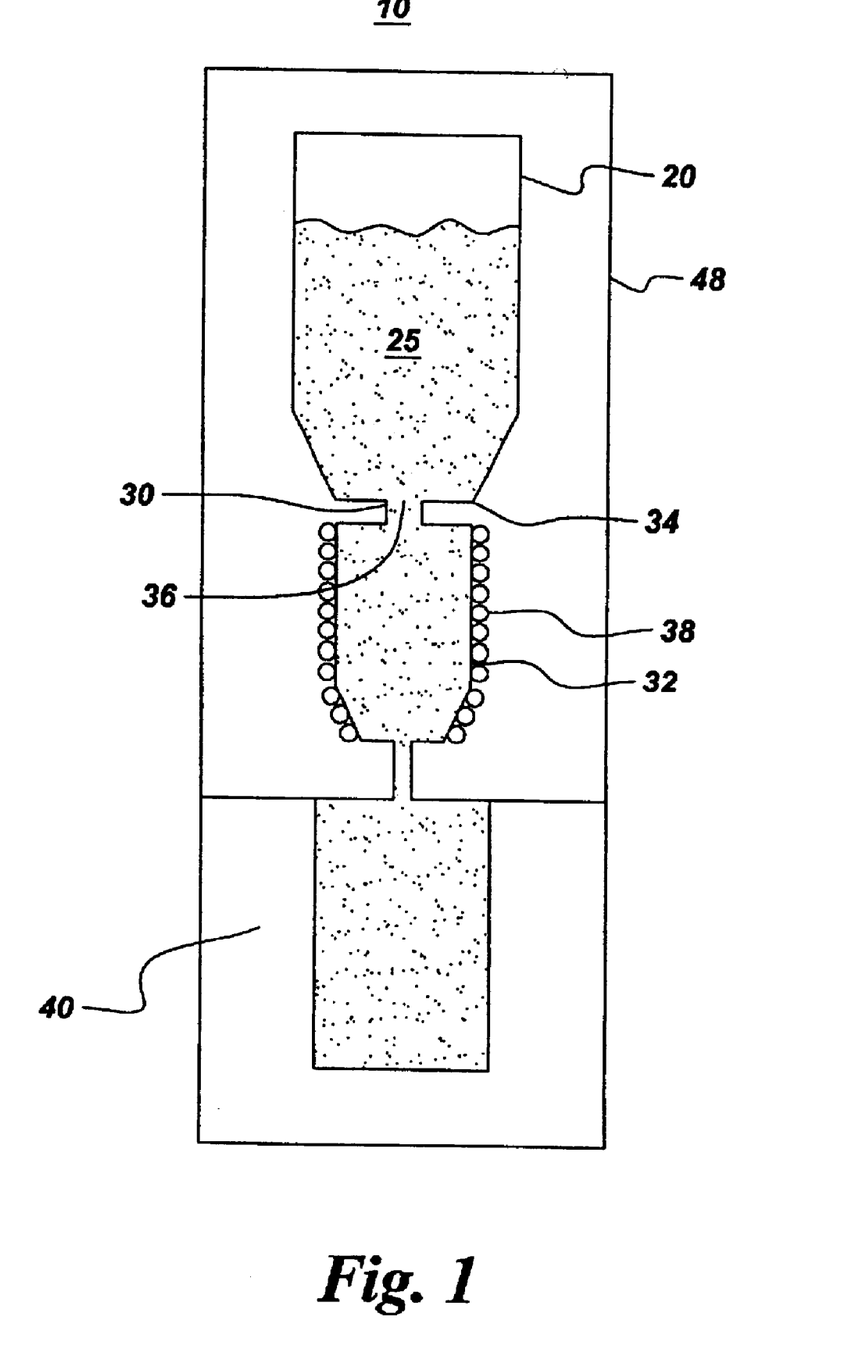
FIG. 1 is a schematic cross-sectional view of an apparatus of the present invention.

Referring to the drawings in general and to FIG. 1 in particular, it will be understood that the illustrations are for the purpose of describing an exemplary embodiment of the invention and are not intended to limit the invention thereto. FIG. 1 is a cross-sectional representation of an apparatus for casting an article, in accordance with embodiments of the present invention. Apparatus 10 comprises a means for forming a molten material 20. Molten material 25 comprises at least one of a metal and an alloy, such as the aforementioned Nb—Si alloys and Mo—Si alloys. In one embodiment, means for forming molten material 20 is capable of forming a molten material from metals and alloys having a melting point of at least 1500° C. Any of various devices used in the art to melt metals and alloys are suitable for use in embodiments of the present invention, including, for example, an arc melter, an electron beam melter, and an induction skull melter. It will be understood by those skilled in the art that any of the array of variations that may be contemplated for the above exemplary means for forming a molten material 20 are also suitable for use in embodiments of the present invention. For example, where means for forming molten material 20 is an arc melter, the arc melter, in some embodiments, is one of a plasma arc melter and a vacuum arc melter.

The characteristics desired for means for forming a molten material 20 are often dictated by the composition and properties of the material to be melted. For example, in certain embodiments, means for forming a molten material 20 comprises a means for forming a molten material having a melting temperature of at least 1600° C. In particular embodiments, molten material 25 comprises silicon and at least one of niobium, titanium, molybdenum, and chromium. In some cases, the reactivity of molten material 25 is sufficiently high to warrant precautions taken to avoid undesirable interaction with the structure of apparatus 10. In certain embodiments, for example, means for forming a molten material 20 includes a ceramic-free path for molten material 25. "Ceramic-free path" as used herein means that the structure of means for forming a molten material 20 in contact with molten material 25 is substantially free of ceramic materials such as oxides, nitrides, silicides, and the like, which may react with certain molten material 25 and thus damage apparatus 10 and contaminate molten material 25.

Apparatus 10 further comprises a means for pouring 30 molten material 25 from means for forming a molten material 20 and includes a cup 32 for receiving molten material 25 in a superheated state. In some embodiments, means for pouring 30 includes one of a tilt-pour tundish and a bottom-pour tundish. The non-limiting, exemplary embodiment depicted in FIG. 1 illustrates an instance in which means for pouring 30 comprises a bottom-pour tundish 34. In particular embodiments, bottom-pour tundish 34 further includes an orifice 36 therethrough for pouring molten metal 25 into cup 32. In alternate embodiments, in which means for pouring 30 comprises a tilt-pour tundish (not shown), the tilt-pour tundish may further include a lip (not shown) for pouring molten material 25 into cup 32.

Cup 32 receives molten material 25 in a superheated state from means for forming molten material 20. In embodiments of the present invention, cup 32 comprises a material that is substantially inert in the presence of molten material 25. "Substantially inert" as used herein means that the material in question undergoes no chemical or physical reaction sufficient in degree to significantly alter the composition of molten material 25 or to significantly damage the component comprising the material in question. Those skilled in the art will appreciate that the particular materials selected for cup 32 depend upon the composition of molten material 25. In particular embodiments, cup 32 comprises at least one of alumina, hafnia, stabilized zirconia (such as, but not limited to, yttria stabilized zirconia, ceria stabilized zirconia, and magnesia stabilized zirconia), zirconia, and yttrium aluminum garnet, which have melting points sufficiently high to support casting many high-temperature materials, including, for example, the aforementioned Nb—Si alloys. In certain embodiments, pouring means 30 further includes a heater 38 for maintaining molten material 25 within cup 32 in a superheated state. This action of heater 38 enhances control over the temperature of molten material 25, thereby reducing the risk of premature solidification of molten material 25 during the casting process.

Figure 2:
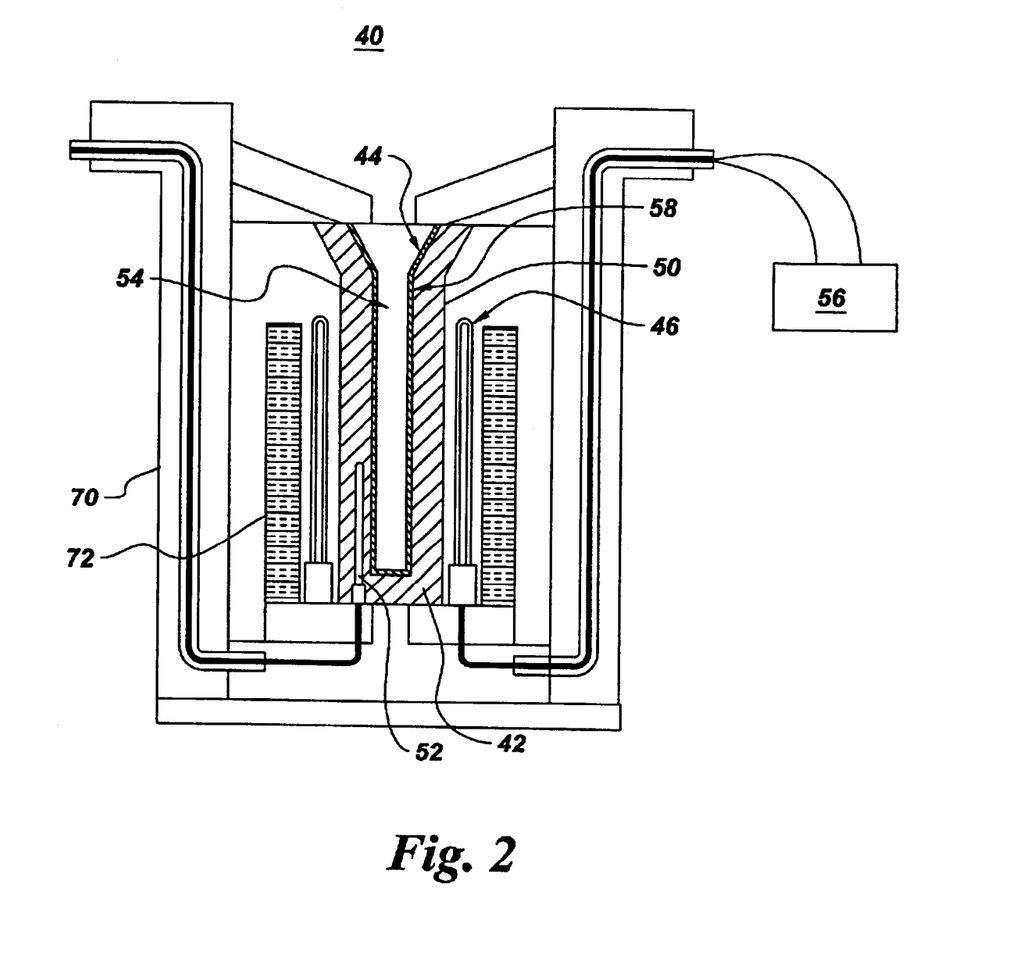
FIG. 2 is a schematic cross-sectional view of a mold assembly of the present invention.

Apparatus 10 further comprises a mold assembly 40 for receiving molten material 25 from cup 32. A detailed illustration of an exemplary embodiment of mold assembly 40 is shown in FIG. 2. Mold assembly 40 comprises a solid shell 42, also referred to as a mold, for containing molten material 25. The same materials that are used to form cup 32 are suitable materials for constructing shell 42. These materials have melting points sufficiently high to support casting many high-temperature materials, including, for example, the aforementioned Nb—Si alloys. Shell 42 may comprise at least one of alumina, hafnia, stabilized zirconia (such as, but not limited to, yttria stabilized zirconia, ceria stabilized zirconia, and magnesia stabilized zirconia), zirconia, and yttrium aluminum garnet. Shell 42 is manufactured as described above for the process of investment casting and is configured such that molten material 25 solidifies therein to form a near-net-shape of the article being cast. Mold assembly 40 further comprises a heater assembly 46 for maintaining shell 42 at a predetermined temperature.

Shell 42 further comprises a protective layer, or face coat 44, disposed on an inner surface 58 of shell 42 such that face coat 44 is interposed between shell 42 and molten material 25. Face coat 44 may be applied during the aforementioned process of manufacturing molds, by first coating the expendable mold pattern with a slurry comprising the desired face coat 44 material, followed by coating the coated mold pattern with the desired shell 42 material. Face coat 44 serves as a protective barrier between molten material 25 and the remainder of shell 42, and is substantially inert to molten material 25. Face coat 44 comprises a refractory metal and at least one of oxygen, sulfur, silicon, and combinations thereof. Face coat 44 may, for example, comprise oxides, silicides, silicates, oxysulfides, and sulfides of rare earth metals (such as, but not limited to, yttrium, cerium, and erbium), refractory metals (such as, but not limited to, hafnium and zirconium), and mixtures thereof. In some embodiments, face coat 44 has a melting temperature of at least about 1900° C. In certain embodiments, face coat 44 comprises at least one of hafnia, erbia, zircon, yttria, ceria, zirconia, and stabilized zirconia, such as, but not limited to, yttria stabilized zirconia, ceria stabilized zirconia, and magnesia stabilized zirconia. These materials are substantially inert to several high-temperature molten materials, including, for example, the aforementioned Nb—Si and Mo—Si alloys. In particular embodiments, where cup 32 comprises a material that is not substantially inert to molten material 25, such as alumina, face coat 44 is disposed on cup 32 so as to be interposed between molten material 25 and cup 32.

In certain embodiments, face coat 44 has a thickness from about 5 microns to about 100 microns, and in particular embodiments, face coat 44 has a thickness from about 5 microns to about 50 microns. In some embodiments, face coat 44 comprises at least one layer; i.e., face coat 44 may comprise either a single layer of material or a plurality of layers.

Certain molten materials 25, such as, for example, Nb—Si alloys, are reactive with the ambient atmosphere, and thus improved results are often obtained where the casting process takes place in an environment that is substantially inert to the molten material 25. Consequently, embodiments of the present invention are included in which apparatus 10 further includes an enclosure 48 for containing means for forming a molten material 20, means for pouring 30 molten material 25, and mold assembly 40 under one of a vacuum and an inert gas. Examples of inert gas include, but are not limited to, argon and helium.

In one particular embodiment of mold assembly 40 of the present invention, solid shell 42 comprises a ceramic shell 42 defining a cavity 54 for receiving molten material 25, the molten material 25 being at a first temperature when received by the cavity. In order to contain molten material 25 without melting, ceramic shell 42, in certain embodiments, has a melting point greater than the first temperature. In some embodiments, ceramic shell 42 comprises at least one of the materials, such as at least one of alumina, hafnia, stabilized zirconia (such as, but not limited to, yttria stabilized zirconia, ceria stabilized zirconia, and magnesia stabilized zirconia), zirconia, and yttrium aluminum garnet, that have been previously set forth for shell 42. In some embodiments, ceramic shell 42 comprises at least one discrete layer of a ceramic material. Ceramic shell (or mold) 42 further comprises at least one face coat 44 of a refractory material disposed on an inner surface 58 of ceramic shell 42 in cavity 54. The refractory material comprises at least one of hafnia, ceria, erbia, zircon, yttria, zirconia and stabilized zirconia (such as, but not limited to, yttria stabilized zirconia, ceria stabilized zirconia, and magnesia stabilized zirconia). The thickness and melting temperature of face coat 44 have been previously described above for other embodiments of the present invention.

Mold assembly 40 further comprises a heater assembly for heating ceramic shell 42 to a predetermined temperature and controlling a temperature of ceramic shell 42. Heater assembly is proximate to an outer surface 50 of ceramic shell 42. In certain embodiments, heater assembly comprises at least one heating element 46, at least one temperature sensor 52 for sensing a temperature of ceramic shell 42, and a power supply 56 electrically coupled to the at least one heating element 46 and the at least one temperature sensor 52. Power supply 56 provides electrical power to the at least one heating element 46 and controls the temperature of ceramic shell 42, thereby further reducing the risk of localized premature solidification of molten material 25. Mold assembly 40 may be either resistively or inductively heated by the at least one heating element 46. The at least one heating element 46 comprises a suitable material such as, but not limited to, silicon carbide, molybdenum, tungsten, and the like. In particular embodiments, the at least one heating element 46 comprises at least one of resistively heated bars, wires, rods, and igniters.

Other features may be included to further enhance the performance of mold assembly 40 of the present invention. For example, in some embodiments, mold assembly 40 further comprises an outer cooling jacket 70, such as, for example, a jacket comprising a water-cooled copper shell, to provide additional control over the temperature of mold 42. Furthermore, in some embodiments, mold assembly 40 further includes at least one heat shield 72 for insulating ceramic shell 42; in particular embodiments, the at least one heat shield 72 includes at least one of a baffle (not shown) and an insulating material.

Figure 3:
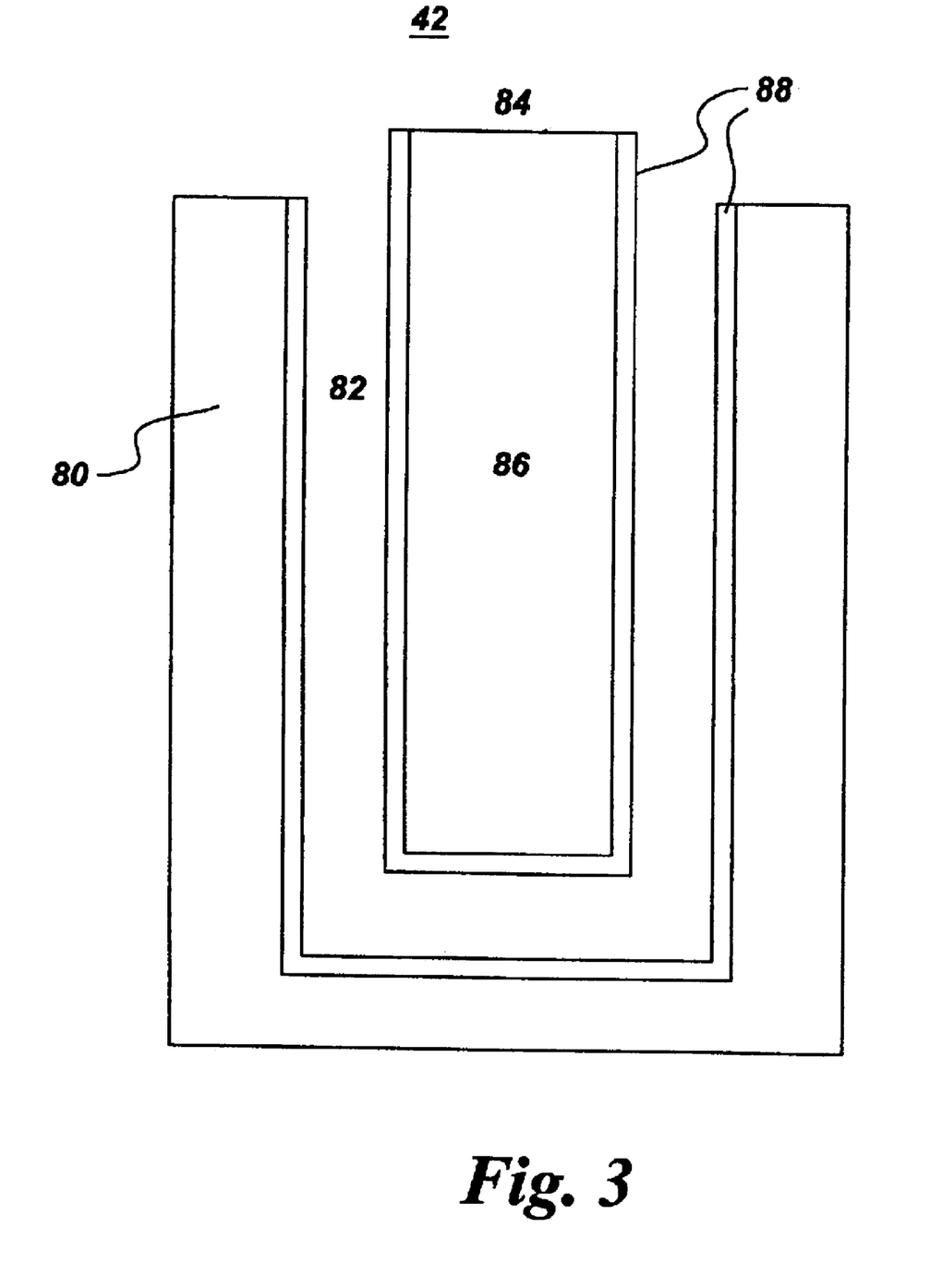
FIG. 3 is a schematic cross-sectional view of a mold assembly of the present invention adapted to cast a hollow article.

In some embodiments, mold assembly 40 may be adapted to cast a hollow article, as shown in FIG. 3. In this embodiment, ceramic shell 42 comprises an outer ceramic shell 80 having a hollow 82 therein. The aforementioned face coat 88 is disposed on the surface of the ceramic shell adjacent to the hollow. An inner core 84 comprising an inner ceramic shell 86 and the aforementioned face coat 88 is disposed within hollow 82. Molten material 25 is poured into hollow 82, wherein molten material solidifies to form a hollow near-net shape article.

To further exploit the advantages of the embodiments described above, embodiments of the present invention also include instances in which mold assembly 40 (FIG. 2) is employed as the mold assembly 40 of the aforementioned apparatus 10 (shown in FIG. 1) for casting an article. The alternatives and features described above for the various components of apparatus 10 and mold assembly 40 apply to these embodiments as well.

A further embodiment of the present invention is a method of casting a near-net shape of an article. The method comprises forming a molten material 25 comprising at least one of a metal and an alloy. Forming molten material 25 is performed using any of several suitable techniques, including, for example, arc melting, electron beam melting, plasma melting, and induction skull melting. In particular embodiments, forming molten material 25 comprises providing an alloy comprising silicon and at least one of niobium, molybdenum, titanium, and chromium, and forming a molten material comprising the alloy.

The method further comprises pouring molten material 25 into a cup 32, as described for previous embodiments, above; maintaining molten material 25 in a superheated state within cup 32; receiving the molten material 25 from the cup in a mold assembly 40, wherein the mold assembly comprises a solid shell 42 for containing the molten material, the solid shell having a face coat 44 disposed on an inner surface of the solid shell 42 that contacts the molten material, the face coat 44 comprising at least one of a rare earth metal (such as, but not limited to, yttrium, cerium, and erbium), refractory metals (such as, but not limited to, hafnium and zirconium) and at least one of oxygen, sulfur, silicon, and combinations thereof; and solidifying the molten material 25 in the mold assembly 40 to form the near-net shape article. In some embodiments, receiving the molten material 25 from cup 32 in mold assembly 40 further comprises maintaining the molten material 25 in a fluid state within the mold assembly 40, for example, by heating mold assembly 40 to a temperature at which the molten material 25 is maintained in a fluid state. In some embodiments, mold assembly 40 is heated up to at least about 1300° C. in order to maintain molten material 25 in a fluid state. The alternatives set forth above for mold assembly 40 of the present invention, such as, for example, the materials of construction, are applicable to the method embodiments as well.

Articles suitable for casting by apparatus 10 of the present invention, and through the use of the method of the present invention, include, for example, a turbine component such as an airfoil, and many other parts which benefit from the aforementioned advantages of a near-net-shape casting process. For example, one embodiment of the present invention is a turbine airfoil comprising at least one alloy comprising silicon and at least one of niobium, molybdenum, titanium, and chromium, wherein the turbine airfoil is cast by the method of the present invention. Such an airfoil will have superior properties to those cast from standard superalloys.

The following examples serve to illustrate the features and advantages of the present invention.

EXAMPLE 1

Figure 4:
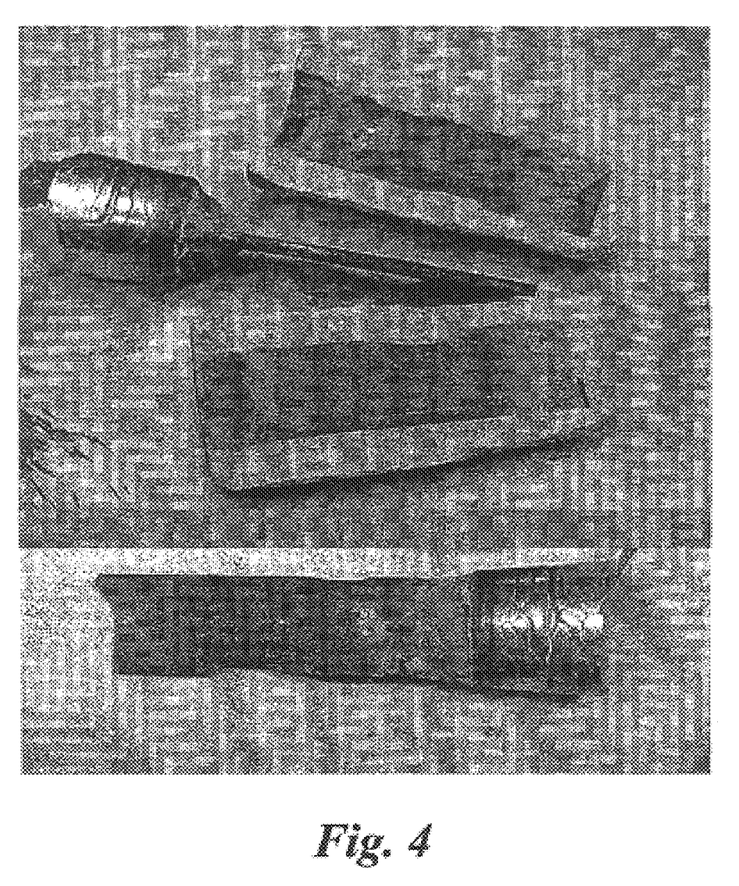
FIG. 4 is a photograph of a plate cast using the apparatus of the present invention.

A rectangular plate of a Nb—Ti—Si alloy having a composition of 50 atomic percent Nb, 34 atomic percent Ti, and 16 atomic percent Si was investment cast in the apparatus of the present invention. The rectangular plate was cast using a mold assembly comprising an alumina mold, or shell, and a zircon facecoat. The mold was preheated to a temperature of at least 1200° C. The dimensions of the rectangular plate were 3" length×1" width×0.125" thick. The cast plate is shown in FIG. 4. The cast plate had a microstructure comprising dendrites of the metal beta phase in a matrix of the $Nb_3Si$ intermetallic phase, as dictated by the Nb—Ti—Si ternary phase diagram.

EXAMPLE 2

Figure 5A:
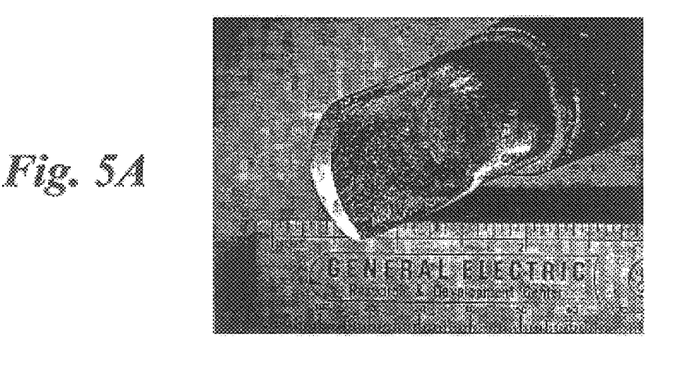
FIGS. 5a, 5b, and 5c are photographs of an airfoil cast using the apparatus of the present invention.
Figure 5B:
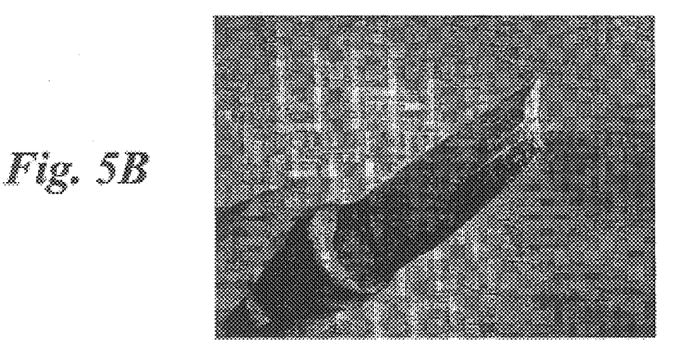
Figure 5C:
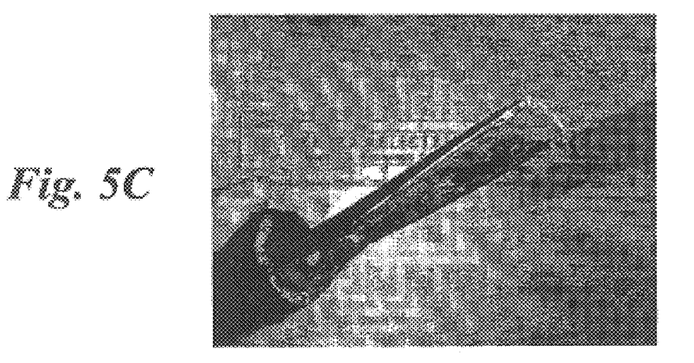

An airfoil having the composition of 50 atomic percent Nb, 23 atomic percent Ti, 2 atomic percent Hf, 16 atomic percent Si, 1.5 atomic percent Ge, 4 atomic percent Cr, 3 atomic percent Al, and 1 atomic percent Sn was cast using the apparatus of the present invention. The mold assembly used to cast the airfoil comprised an alumina mold, or shell, and a zircon facecoat. The mold was preheated to a temperature of about 1300° C. The cast airfoil is shown in FIGS. 5a, 5b, and 5c. This result demonstrates that Nb—Si based composite materials can be investment cast into different near-net-shape articles, including airfoils, using the apparatus and methods of the present invention.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. An apparatus for casting an article, said apparatus comprising:
    (a) a means for forming a molten material, said molten material comprising at least one of a metal and an alloy;
    (b) a means for pouring said molten material from said means for forming said molten material, wherein said means for pouring said molten material includes a cup for receiving said molten material in a superheated state;
    (c) a mold assembly for receiving said molten material from said cup, said mold assembly comprising a solid shell for containing said molten material, the shell having a face coat, wherein said face coat is disposed on an inner surface that contacts said molten material such that said face coat is interposed between said solid shell and said molten material, said face coat comprising at least one of an oxide, a silicide, a silicate, an oxysulfide, and a sulfide and containing at least one of a rare earth metal, a refractory metal, and combinations thereof, and a heater assembly for maintaining said solid shell at a predetermined temperature, wherein said molten material solidifies within said solid shell to form a near-net shape of said article.

2. The apparatus according to claim 1, wherein said refractory metal is one of hafnium and zirconium, and wherein said rare earth metal is one of yttrium, erbium, and cerium.

3. The apparatus according to claim 2, wherein said face coat has a melting temperature of at least about 1900° C.

4. The apparatus according to claim 2, wherein said face coat comprises at least one of hafnia, erbia, zircon, yttria, ceria, zirconia and at least one stabilized zirconia.

5. The apparatus according to claim 2, wherein said face coat has a thickness from about 5 microns to about 100 microns.

6. The apparatus according to claim 5, wherein said face coat has a thickness from about 5 microns to about 50 microns.

7. The apparatus according to claim 2, wherein said face coat comprises at least one layer.

8. The apparatus according to claim 1, wherein said means for forming said molten material comprises one of an arc melter, an electron beam melter, and an induction skull melter.

9. The apparatus according to claim 8, wherein said arc melter is one of a plasma arc melter, a vacuum arc melter, and a vacuum arc remelter.

10. The apparatus according to claim 1, further including an enclosure for containing said means for forming said molten material, said means for pouring said molten material, and said mold assembly under one of a vacuum and an inert gas atmosphere.

11. The apparatus according to claim 1, wherein said means for forming said molten material comprises a means for forming a molten material having a melting temperature of at least 1500° C.

12. The apparatus according to claim 11, wherein said molten material comprises silicon and at least one of niobium, titanium, molybdenum, and chromium.

13. The apparatus according to claim 1, wherein said means for forming said molten material includes a ceramic-free path for said molten material.

14. The apparatus according to claim 1, wherein said means for pouring includes one of a tilt-pour tundish and a bottom-pour tundish.

15. The apparatus according to claim 14, wherein said tilt-pour tundish further includes a lip for pouring said molten material into said cup.

16. The apparatus according to claim 14, wherein said bottom-pour tundish further includes an orifice therethrough for pouring said molten material into said cup.

17. The apparatus according to claim 1, wherein said cup comprises at least one of alumina, hafnia, yttria stabilized zirconia, zirconia, and yttrium aluminum garnet.

18. The apparatus according to claim 1, wherein said means for pouring further includes a heater for maintaining said molten material within said cup in said superheated state.

19. The apparatus according to claim 1, wherein said solid shell comprises at least one of alumina, hafnia, yttria stabilized zirconia, zirconia, and yttrium aluminum garnet.

20. The apparatus according to claim 1, wherein said heater assembly comprises at least one heating element, at least one temperature sensor for sensing a temperature of said mold, and a power supply electrically coupled to said at least one heating element and said at least one temperature sensor, wherein said power supply provides electrical power to said at least one heating element and controls said temperature.

21. The apparatus according to claim 20, wherein said at least one heating element comprises at least one of silicon carbide, molybdenum, and tungsten.

22. The apparatus according to claim 20, wherein said at least one heating element is a resistively heated heating element comprising at least one of a bar, a rod, a tube, a wire, and combinations thereof.

23. The apparatus according to claim 20, wherein said at least one heating element is an inductively heated heating element.

24. The apparatus according to claim 20, wherein said mold comprises:
    a) an outer solid shell having a hollow therein; wherein said at least one face coat is disposed on an inner surface of said outer solid shell such that said face coat is interposed between said outer solid shell and said molten material; and b) an inner core disposed in said hollow, said inner core comprising a inner solid shell, wherein said face coat is disposed on an outer surface of said inner solid shell such that said face coat is interposed between said inner solid shell and said molten material.

25. A mold assembly for casting an article from a molten material, said mold assembly comprising:

a) a mold comprising a ceramic shell defining a cavity therein for receiving said molten material within said cavity, and at least one face coat of a refractory material disposed on an inner surface of said ceramic shell in said cavity such that said face coat is interposed between said solid shell and said molten material, wherein said refractory material comprises at least one of hafnia, erbia, zircon, yttria, ceria, zirconia and at least one stabilized zirconia; and b) a heater assembly for heating said mold to a predetermined temperature and controlling a temperature of said mold, said heater assembly being proximate to an outer surface of said mold.

26. The mold assembly according to claim 25, wherein said molten material is at a first temperature when received within said cavity, and wherein said ceramic shell has a melting point greater than said first temperature.

27. The mold assembly according to claim 25, wherein said ceramic shell comprises at least one of alumina, hafnia, yttria stabilized zirconia, zirconia, and yttrium aluminum garnet.

28. The mold assembly according to claim 26, wherein said ceramic shell comprises at least one discrete layer of a ceramic material.

29. The mold assembly according to claim 25, further including an outer cooling jacket for cooling said mold.

30. The mold assembly according to claim 29, wherein said cooling jacket comprises a water-cooled copper shell.

31. The mold assembly according to claim 25, further including at least one heat shield for insulating said mold.

32. The mold assembly according to claim 31, wherein said at least one heat shield includes at least one of a baffle and an insulating material.

33. The mold assembly according to claim 25, wherein said heater assembly comprises at least one heating element, at least one temperature sensor for sensing a temperature of said mold, and a power supply electrically coupled to said at least one heating element and said at least one temperature sensor, wherein said power supply provides electrical power to said at least one heating element and controls said temperature.

34. The mold assembly according to claim 33, wherein said at least one heating element comprises at least one of silicon carbide, molybdenum, and tungsten.

35. The mold assembly according to claim 33, wherein said at least one heating element is a resistively heated heating element comprising at least one of a bar, a rod, a tube, a wire, and combinations thereof.

36. The mold assembly according to claim 33, wherein said at least one heating element is an inductively heated heating element.

37. The mold assembly according to claim 25, wherein said at least one face coat has a melting temperature of at least 1900° C.

38. The mold assembly according to claim 25, wherein said at least one face coat has a thickness from about 5 microns to about 100 microns.

39. The mold assembly according to claim 38, wherein said at least one face coat has a thickness from about 5 microns to about 50 microns.

40. The mold assembly according to claim 25, wherein said mold comprises:

a) an outer ceramic shell having a hollow therein; wherein said at least one face coat is disposed on an inner surface of said outer ceramic shell such that said face coat is interposed between said outer ceramic shell and said molten material; and b) an inner core disposed in said hollow, said inner core comprising a inner ceramic shell, wherein said face coat is disposed on an outer surface of said inner ceramic shell such that said face coat is interposed between said inner ceramic shell and said molten material.

41. An apparatus for casting an article, said apparatus comprising:

(a) a means for forming a molten material, said molten material comprising at least one of a metal and an alloy;

(b) a means for pouring said molten material from said means for forming said molten material, wherein said means for pouring said molten material includes a cup for receiving said molten material in a superheated state;

(c) a mold assembly for receiving said molten material from said cup, said mold assembly comprising a ceramic shell for containing said molten material, said ceramic shell defining a cavity therein for accepting said molten material, and at least one face coat of a refractory material disposed on an inner surface of said ceramic shell in said cavity such that said face coat is interposed between said solid shell and said molten material, said refractory material comprising at least one of hafnia, erbia, zircon, yttria, ceria, zirconia, and a stabilized zirconia, wherein said face coat contacts said molten material, and wherein said molten material solidifies within said ceramic shell to form a near-net shape of said article; and (d) a heater assembly for heating said mold to a predetermined temperature and controlling a temperature of said mold, said heater assembly being proximate to an outer surface of said mold.

42. The apparatus according to claim 41, wherein said molten material is at a first temperature when received within said cavity, and wherein said ceramic shell has a melting point greater than said first temperature.

43. The apparatus according to claim 41, wherein said ceramic shell comprises at least one of alumina, hafnia, yttria stabilized zirconia, zirconia, and yttrium aluminum garnet.

44. The apparatus according to claim 41, wherein said ceramic shell comprises at least one discrete layer of a ceramic material.

45. The apparatus according to claim 41, further including an outer cooling jacket for cooling said mold.

46. The apparatus according to claim 45, wherein said outer cooling jacket comprises a water-cooled copper shell.

47. The apparatus according to claim 41, further including at least one heat shield for insulating said mold.

48. The apparatus according to claim 47, wherein said at least one heat shield includes at least one of a baffle and an insulating material.

49. The apparatus according to claim 41, wherein said heater assembly comprises at least one heating element, at least one temperature sensor for sensing a temperature of said mold, and a power supply electrically coupled to said at least one heating element and said at least one temperature sensor, wherein said power supply provides electrical power to said at least one heating element and controls said temperature.

50. The apparatus according to claim 49, wherein said at least one heating element comprises at least one of silicon carbide, molybdenum, and tungsten.

51. The apparatus according to claim 49, wherein said at least one heating element is a resistively heated heating element comprising at least one of a bar, a rod, a tube, a wire, and combinations thereof.

52. The apparatus according to claim 49, wherein said at least one heating element is an inductively heated heating element.

53. The apparatus according to claim 41, wherein said at least one face coat has a melting temperature of at least 1900° C.

54. The apparatus according to claim 41, wherein said at least one face coat has a thickness from about 5 microns to about 100 microns.

55. The apparatus according to claim 54, wherein said at least one face coat has a thickness from about 5 microns to about 50 microns.

56. The apparatus according to claim 41, wherein said mold comprises:
   a) an outer ceramic shell having a hollow therein; wherein said at least one face coat is disposed on an inner surface of said outer ceramic shell such that said face coat is interposed between said outer ceramic shell and said molten material; and
   b) an inner core disposed in said hollow, said inner core comprising a inner ceramic shell, wherein said face coat is disposed on an outer surface of said inner ceramic shell such that said face coat is interposed between said inner ceramic shell and said molten material.

57. The apparatus according to claim 41, wherein said means for forming said molten material comprises one of an arc melter, an electron beam melter, and an induction skull melter.

58. The apparatus according to claim 57, wherein said arc melter is one of a plasma arc melter, a vacuum arc melter, and a vacuum arc remelter.

59. The apparatus according to claim 41, further including an enclosure for containing said means for forming said molten material, said means for pouring said molten material, and said mold assembly under one of a vacuum and an inert gas atmosphere.

60. The apparatus according to claim 41, wherein said means for forming said molten material comprises a means for forming a molten material having a melting temperature of at least 1500° C.

61. The apparatus according to claim 41, wherein said molten material comprises silicon and at least one of niobium, titanium, molybdenum, and chromium.

62. The apparatus according to claim 41, wherein said means for forming said molten material includes a ceramic-free path for said molten material.

63. The apparatus according to claim 41, wherein said means for pouring includes one of a tilt-pour tundish and a bottom-pour tundish.

64. The apparatus according to claim 63, wherein said tilt-pour tundish further includes a lip for pouring said molten material into said cup.

65. The apparatus according to claim 63, wherein said bottom-pour tundish further includes an orifice therethrough for pouring said molten material into said cup.

66. The apparatus according to claim 41, wherein said cup comprises at least one of alumina, hafnia, yttria stabilized zirconia, zirconia, and yttrium aluminum garnet.

67. The apparatus according to claim 41, wherein said means for pouring further includes a heater for maintaining said molten material within said cup in said superheated state.

68. The apparatus according to claim 41, wherein said article is a turbine component.

69. The apparatus according to claim 68, wherein said turbine component is an airfoil.

70. A method of casting a near-net shape article, the method comprising the steps of:
   (a) forming a molten material comprising at least one of a metal and an alloy;
   (b) pouring the molten material into a cup;
   (c) maintaining the molten material in a superheated state within the cup;
   (d) receiving the molten material from the cup in a mold assembly, wherein the mold assembly comprises a solid shell for containing the molten material, the solid shell having a face coat disposed on an inner surface of the solid shell that contacts the molten material, the face coat comprising at least one of an oxide, a silicide, a silicate, an oxysulfide, and a sulfide and containing at least one of a rare earth metal, a refractory metal, and combinations thereof, and a heater assembly for maintaining the solid shell at a predetermined temperature; and
   (e) solidifying the molten material in the mold assembly to form the near-net shape article.

71. The method according to claim 70, wherein the step of forming a molten material comprising at least one of a metal and an alloy comprises:
   (a) providing an alloy comprising silicon and at least one of niobium, molybdenum, titanium, and chromium; and
   (b) forming a molten material comprising the alloy.

72. The method according to claim 70, wherein the step of forming a molten material comprising at least one of a metal and an alloy comprises arc melting at least one of a metal and an alloy to form a molten material.

73. The method according to claim 70, wherein the step of forming a molten material comprising at least one of a metal and an alloy comprises electron beam melting at least one of a metal and an alloy to form a molten material.

74. The method according to claim 70, wherein the step of forming a molten material comprising at least one of a metal and an alloy comprises plasma melting at least one of a metal and an alloy to form a molten material.

75. The method according to claim 70, wherein the step of forming a molten material comprising at least one of a metal and an alloy comprises induction skull melting at least one of a metal and an alloy to form a molten material.

76. The method according to claim 70, wherein the step of receiving the molten material from the cup in a mold assembly further comprises maintaining the molten material in a fluid state within the mold assembly.

77. The method according to claim 76, wherein the step of maintaining the molten material in a fluid state within the mold assembly comprises heating the mold assembly to a temperature at which the molten material is in a fluid state.

78. The method according to claim 77, wherein the step of heating the mold assembly to a temperature at which the molten material is in a fluid state comprises heating the mold assembly to a temperature of at least about 1300° C.

79. The method according to claim 70, wherein the step of receiving the molten material from the cup in a mold assembly comprises receiving the molten material from the cup in a mold assembly comprising a ceramic shell and at least one face coat of a refractory material disposed on an inner surface of the ceramic shell, wherein the refractory material comprises at least one of hafnia, erbia, zircon, yttria, zirconia, and stabilized zirconia.

80. The method according to claim 70, wherein the near-net shape article is a hollow article and wherein the step of receiving the molten material from the cup in a mold assembly comprises receiving the molten material from the cup in a mold assembly comprising an outer ceramic shell having a hollow therein and an inner core disposed in the hollow; wherein at least one face coat is disposed on an inner surface of the outer ceramic shell and an outer surface of the inner ceramic shell such that the face coat is interposed between the molten material and each of the outer ceramic shell and the inner ceramic shell.

81. The method according to claim 70, wherein the near-net shape article is a turbine airfoil.

82. A method of casting a near-net shape article from at least one alloy comprising silicon and at least one of niobium, molybdenum, titanium, and chromium, the method comprising the steps of:
(a) providing the at least one alloy comprising silicon and at least one of niobium, molybdenum, titanium, and chromium;
(b) forming a molten material comprising the alloy;
(c) pouring the molten material into a cup;
(d) maintaining the molten material in a superheated state within the cup;
(e) receiving the molten material from the cup in a mold assembly, wherein the mold assembly comprises a ceramic shell having a cavity for receiving the molten material, at least one face coat of a refractory material disposed on an inner surface of the ceramic shell in the cavity, wherein the refractory material comprises at least one of hafnia, erbia, zircon, yttria, zirconia, and stabilized zirconia, and a heater assembly for maintaining the solid shell at a predetermined temperature; and
(f) solidifying the molten material in the mold assembly to form the near-net shape article.

83. The method according to claim 82, wherein the step of forming a molten material comprising the alloy comprises arc melting the at least one alloy to form a molten material.

84. The method according to claim 83, wherein the step of arc melting the at least one alloy to form a molten material comprises one of plasma arc melting the at least one alloy, vacuum art melting the at least one alloy, and vacuum arc remelting the at least one alloy to form a molten material.

85. The method according to claim 83, wherein the step of forming a molten material comprising the alloy comprises one of plasma melting the at least one alloy and induction skull melting the at least one alloy to form a molten material.

86. The method according to claim 83, wherein the step of receiving the molten material from the cup in a mold assembly further comprises maintaining the molten material in a fluid state within the mold assembly.

87. The method according to claim 86, wherein the step of maintaining the molten material in a fluid state within the mold assembly comprises heating the mold assembly to a temperature at which the molten material is in a fluid state.

88. The method according to claim 87, wherein the step of heating the mold assembly to a temperature at which the molten material is in a fluid state comprises heating the mold assembly to a temperature of at least about 1300° C.

89. The method according to claim 82, wherein the near-net shape article is a hollow article and wherein the step of receiving the molten material from the cup in a mold assembly comprises receiving the molten material from the cup in a mold assembly comprising an outer ceramic shell having a hollow therein and an inner core disposed in the hollow; wherein at least one face coat is disposed on an inner surface of the outer ceramic shell and an outer surface of the inner ceramic shell such that the face coat is interposed between the molten material and each of the outer ceramic shell and the inner shell.

90. The method according to claim 82, wherein the near-net shape article is a turbine airfoil.

91. A near-net shape article comprising at least one alloy, the at least one alloy comprising silicon and at least one of niobium, molybdenum, titanium, and chromium, wherein the near-net shape article is cast by:
(a) forming a molten material comprising the at least one alloy;
(b) pouring the molten material into a cup;
(c) maintaining the molten material in a superheated state within the cup;
(d) receiving the molten material from the cup in a mold assembly, wherein the mold assembly comprises a ceramic shell, at least one face coat of a refractory material disposed on an inner surface of the ceramic shell in the cavity, wherein the refractory material comprises at least one of hafnia, erbia, zircon, yttria, zirconia, and stabilized zirconia, and a heater assembly for maintaining the solid shell at a predetermined temperature;
(e) heating the mold assembly to a temperature at which the molten material is in a fluid state; and
(f) solidifying the molten material in the mold assembly to form the near-net shape article.

92. The near-net shape article of claim 91, wherein the near-net shape article is a turbine airfoil.

93. The near-net shape article of claim 91, wherein the near-net shape article is a hollow article and wherein the step of receiving the molten material from the cup in a mold assembly comprises receiving the molten material from the cup in a mold assembly comprising an outer ceramic shell having a hollow therein and an inner core disposed in the hollow; wherein at least one face coat is disposed on an inner surface of the outer ceramic shell and an outer surface of the inner ceramic shell such that the face coat is interposed between the molten material and each of the outer ceramic shell and the inner shell.

* * * * *